Nov. 21, 1950 F. A. THAHELD 2,530,741
DIESEL ENGINE IDLING CONTROL
Filed Feb. 11, 1946
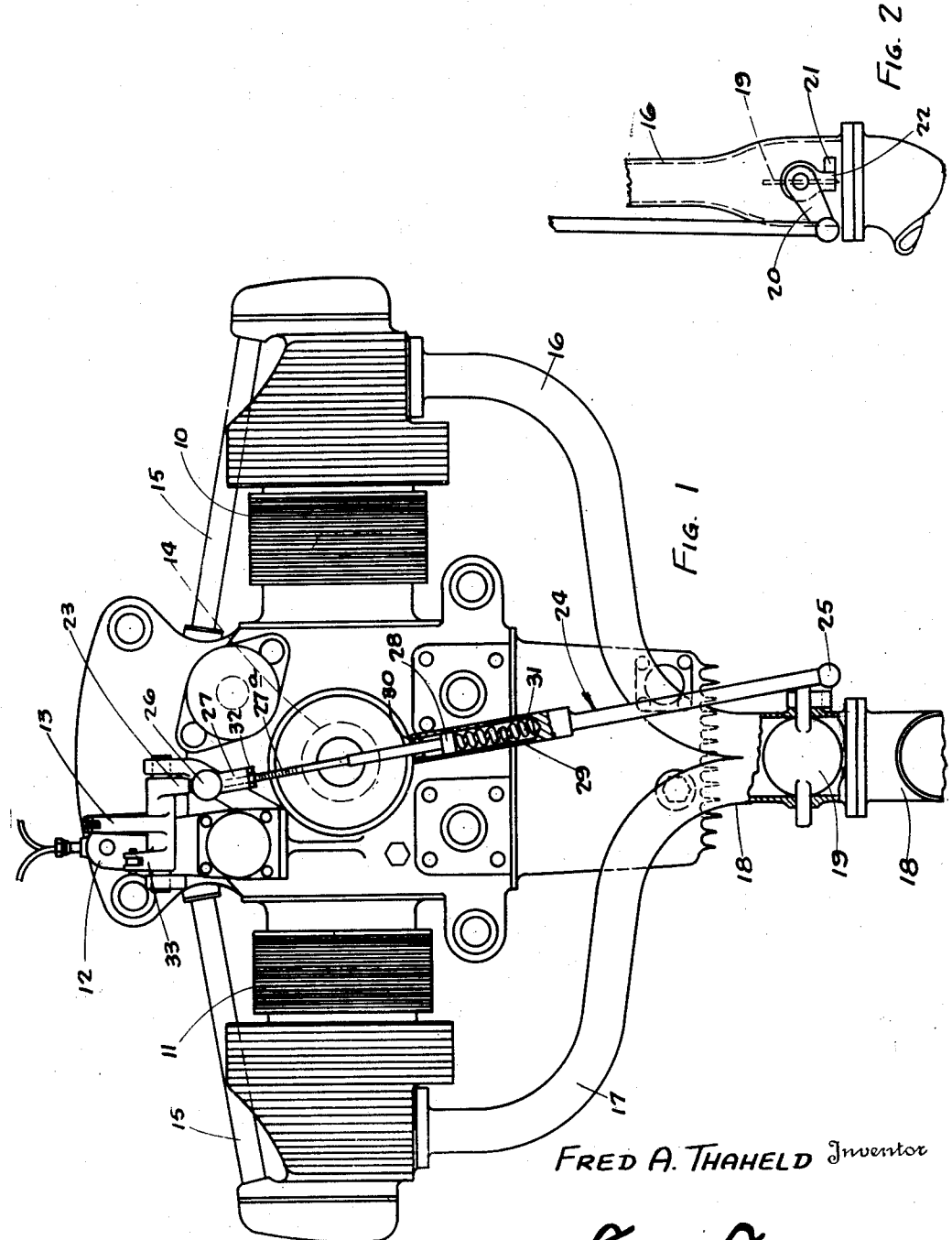
Fred A. Thaheld, Inventor
By Lyon & Lyon
Attorneys Patented Nov. 21, 1950

2,530,741

UNITED STATES PATENT OFFICE 2,530,741

DIESEL ENGINE IDLING CONTROL

Fred A. Thaheld, Brea, Calif., assignor, by mesne assignments, to Diesel Power Inc., Pittsburgh, Pa., a corporation of Pennsylvania Application February 11, 1946, Serial No. 646,851

2 Claims. (Cl. 123—27)

This invention relates to engines of the Diesel type and is particularly directed to an improvement for controlling the operation of aircraft Diesel engines at or near idling speeds.

The friction horse power loss in an aircraft type Diesel engine is usually at a minimum since relatively small bearing surfaces are employed and since the weight of the rotating and reciprocating parts is held as low as possible. At idling speeds the propeller load is small and the friction load is likewise very low. Under such conditions aircraft Diesel engines have been found to hunt or lope to an objectional extent. This lack of uniform speed under no-load conditions is particularly objectional in an aircraft engine. Considerable variation in engine speed during the interval that the aircraft is maneuvering for landing and losing forward speed preparatory to settling may cause a pilot to over-shoot the field, or to interfere with the normal and regular technique required for effecting a safe landing. It has been found from experience that after dropping down from a cruising altitude toward a landing strip with the engine at idling speed, considerable difficulty may be encountered in maintaining the engine speed constant enough to land at the desired point. The uneven idling characteristics of an aircraft Diesel may be aggravated by relatively cold engine parts which have cooled off from optimum operating temperatures during the long glide under no-load conditions while the plane is losing altitude preparatory to landing.

It is the principal object of my invention to improve the idling characteristics of an aircraft Diesel engine.

Another object is to coordinate the throttle with a means for controlling the idling speed so that the improved operating characteristics are obtained under normal operation of the throttle lever and, therefore, require no additional attention from the pilot.

Other objects and advantages will appear hereinafter.

In the drawings:

Fig. 1 is an end view of an aircraft Diesel engine illustrating the preferred embodiment of my invention.

Fig. 2 is a side elevation of a portion of the device shown in Fig. 1.

Referring to the drawings, a Diesel engine of the aircraft type having pairs of opposed cylinders 10 and 11 is provided with the usual fuel injector mechanism 12 having a pivotally mounted throttle lever 13. A central crank shaft 14 is driven in the usual manner by pistons within the cylinders 10 and 11, and the propeller (not shown) is mounted on the end of the crank shaft 14 extending away from the eye as viewed in Fig. 1. Push rods 15 are provided for operating valves (not shown) at the outer ends of the cylinders 10 and 11. Exhaust conduits 16 and 17 are removably secured in operative position on the cylinders 10 and 11 respectively and converge to a common exhaust pipe 18. A butterfly valve 19 is mounted in the exhaust pipe 18 and is controlled by a crank arm 20 fixed to the valve element 19. A stop lug 21 is attached to the exhaust pipe 18 and is engaged by a projection 22 associated with the lever 20 for limiting pivotal movement of the butterfly valve 19 in one direction. The throttle arm 13 is integrally connected with the fuel injector pump control lever 33 and the crank 23. The crank 23 is connected to the butterfly valve operating lever 20 by a connector element generally designated 24. This connector element is provided at each end with ball and socket joints 25 and 26 for engagement with the arms 20 and 23. The upper portion 27 of the connector element 24 is threaded to receive a bolt element 27a. The lower end of the bolt element 27a carries an enlarged head 28 which operates telescopically within the tube 29 formed on the lower end of the connector element 24. An annular plug 30 is threaded into the upper end of the tube 29, which engages the bolt head 28 to prevent the element 27a from being withdrawn from the tube 29. A coil spring 31 is mounted within the tube 29 and engages the head 28 at its upper end.

The lost motion connection just described serves to maintain the valve element 19 in its inoperative position under normal operation of the engine. The coil spring 31 which is under compression between the head 28 and the lower end of the tube 29 serves to hold the stop elements 21 and 22 in engagement under normal operating conditions. However, when the throttle lever 13 is turned to reduce the fuel charge supplied to the engine the head 28 engages the collar 30 to turn the butterfly valve 19 away from its inoperative position. Such movement of the throttle 13 toward idling position takes up the lost motion between the parts 28 and 30 and therefore turns the valve 19 to present a restriction to the flow of exhaust gases through the pipes 16, 17 and 18. The relative amount of restriction with regard to the throttle position may be varied by adjusting the threaded element 27a with respect to the tube 27 and then using the lock nut 32 for maintaining it in selected position. From this description it will be understood that the major portion of the travel of the throttle lever 13 has no effect on the position of the butterfly valve 19, but as the throttle lever approaches idling position the connector element 24 acts to turn the butterfly element 19 toward a restricting position.

The effect of placing the restriction in the exhaust system is to impose a back pressure on the cylinders and in this way maintain the operating parts of the engine at higher temperatures than they would otherwise operate under idling conditions. This feature in itself contributes to a considerable extent to the smoother operation and less tendency to hunt. Furthermore, the back pressure in the cylinders requires that the engine perform more work at idling speed and, hence, further minimizes the tendency to alternately race and lag.

Having fully described my invention, it is to be understood that I do not wish to be limited to the details herein set forth, but my invention is of the full scope of the appended claims.

I claim:

1. Apparatus for improving the idling characteristics of an aircraft compression ignition engine having a throttle controlled fuel injection device arranged to inject solid fuel into a combustion chamber and an exhaust pipe leading from said combustion chamber, comprising: a turnable element mounted in said exhaust pipe providing a variable restriction, means for turning the element to increase the restriction including connector means actuated by the fuel injection throttle, said connector means including a lost motion connection whereby a substantial portion of the operative travel of the throttle is ineffective for turning said element, and whereby the degree of restriction is increased as the throttle approaches closed position.

2. Apparatus for improving the idling characteristics of an aircraft compression ignition engine having a throttle controlled fuel injection device arranged to inject solid fuel into a combustion chamber and an exhaust pipe leading from said combustion chamber, comprising: a turnable element mounted in the said exhaust pipe providing a variable restriction, resilient means adapted to turn the element to offer a minimum restriction, means for turning the element in opposition to the resilient means including connector means actuated by the fuel injection throttle, said connector means including a lost motion connection whereby a substantial portion of the operative travel of the throttle is ineffective for turning the said element and whereby the degree of restriction is increased as the throttle approaches closed position.

FRED A. THAHELD.

REFERENCES CITED

The following references are of record in the file of this patent:

UNITED STATES PATENTS

| Number | Name | Date |
|---|---|---|
| 1,490,388 | Harkin | Apr. 15, 1924 |
| 1,706,861 | Pokorny | Mar. 26, 1929 |
| 1,933,619 | Edwards | Nov. 7, 1933 |
| 2,117,105 | Schimanek | May 10, 1938 |
| 2,132,445 | Schweizer | Oct. 11, 1938 |
| 2,165,176 | Fodor | July 4, 1939 |